(12) United States Patent
Buttner

(10) Patent No.: US 9,434,461 B2
(45) Date of Patent: Sep. 6, 2016

(54) METHOD FOR TREATING BALLAST WATER AND DEVICE FOR TREATING BALLAST WATER

(71) Applicant: Klaus Buttner, Klein Nordende (DE)

(72) Inventor: Klaus Buttner, Klein Nordende (DE)

(*) Notice: Subject to any disclaimer, the term of this patent is extended or adjusted under 35 U.S.C. 154(b) by 0 days.

(21) Appl. No.: 14/432,112

(22) PCT Filed: Sep. 12, 2013

(86) PCT No.: PCT/DE2013/100325
§ 371 (c)(1),
(2) Date: Mar. 27, 2015

(87) PCT Pub. No.: WO2014/048416
PCT Pub. Date: Apr. 3, 2014

(65) Prior Publication Data
US 2015/0251744 A1 Sep. 10, 2015

(30) Foreign Application Priority Data
Sep. 27, 2012 (DE) .................. 10 2012 018 996

(51) Int. Cl.
*C02F 1/36* (2006.01)
*C02F 1/38* (2006.01)
(Continued)

(52) U.S. Cl.
CPC .............. *B63J 4/002* (2013.01); *B63J 4/004* (2013.01); *C02F 1/004* (2013.01); *C02F 1/325* (2013.01);
(Continued)

(58) Field of Classification Search
CPC .............. B63J 4/002; B63J 4/00; C02F 9/00; C02F 1/36; C02F 1/38; C02F 1/325; C02F 2303/008; C02F 2303/04; C02F 2103/008; B04C 9/00; B04C 9/002; B04C 3/00; B04C 2009/002; B04C 5/10
See application file for complete search history.

(56) References Cited

U.S. PATENT DOCUMENTS 1,931,194 A * 10/1933 Hawley ................ B04C 3/00
55/396
5,466,367 A 11/1995 Coate et al.
(Continued)

FOREIGN PATENT DOCUMENTS

CN 101352629 1/2009
CN 201825773 5/2011
(Continued)

OTHER PUBLICATIONS

Abu-Khader et al., "Ballast Water Treatment Technologies: Hydrocyclonic a Viable Option", Clean Technologies and Environmental Policy, Bd. 13, Nr. 2, Apr. 1, 2011, pp. 403-513.
(Continued)

*Primary Examiner* — David C Mellon
*Assistant Examiner* — Ryan B Huang
(74) *Attorney, Agent, or Firm* — Diederiks & Whitelaw, PLC

(57) ABSTRACT

A device for treating ballast water includes a housing having a ballast water inlet and a ballast water outlet, a hydrocyclone connected to the ballast water inlet and having a particle outlet discharging particles from the device and an outlet carrying particle-depleted ballast water, a filter surrounding the hydrocyclone, which filter divides the device into an intermediate chamber disposed between hydrocyclone and filter and an outer chamber disposed between filter and housing. The intermediate chamber is communicatively connected to the outlet of the hydrocyclone carrying particle-depleted ballast water. Ultrasound is generated to act on the outer chamber and/or the filter, UV light is generated to act on the outer chamber and/or the filter, and a gas is introduced into the outer chamber of the device.

4 Claims, 1 Drawing Sheet

(51) Int. Cl.
*B63J 4/00* (2006.01)
*C02F 1/00* (2006.01)
*C02F 1/32* (2006.01)
*C02F 9/00* (2006.01)
*C02F 103/00* (2006.01)

(52) U.S. Cl.
CPC . *C02F 1/36* (2013.01); *C02F 1/38* (2013.01); *C02F 9/00* (2013.01); C02F 2103/008 (2013.01); C02F 2303/04 (2013.01)

(56) References Cited

U.S. PATENT DOCUMENTS

| | | | | |
|---|---|---|---|---|
| 5,882,530 | A | * | 3/1999 | Chase ............................ 210/788 |
| 2005/0258112 | A1 | * | 11/2005 | Hesse et al. .................. 210/788 |
| 2007/0240975 | A1 | | 10/2007 | Foret |
| 2009/0162258 | A1 | * | 6/2009 | Janssen et al. ............. 422/186.3 |
| 2010/0279373 | A1 | * | 11/2010 | Cordemans de Meulenaer ......... A61K 41/0014 435/173.1 |
| 2012/0043270 | A1 | | 2/2012 | Wang et al. |

FOREIGN PATENT DOCUMENTS

| | | |
|---|---|---|
| CN | 102367192 | 3/2012 |
| DE | 60015180 | 10/2005 |
| DE | 102008025168 | 12/2009 |
| EP | 2199260 | 6/2010 |
| EP | 2412627 | 2/2012 |

OTHER PUBLICATIONS

Tsolaki et al., "Technologies for Ballast WaterTreatment: A Review", Journal of Chemical Technology & Biotechnology, Bd. 85, Nr. 1, Jan. 1, 2010, pp. 19-32.

* cited by examiner

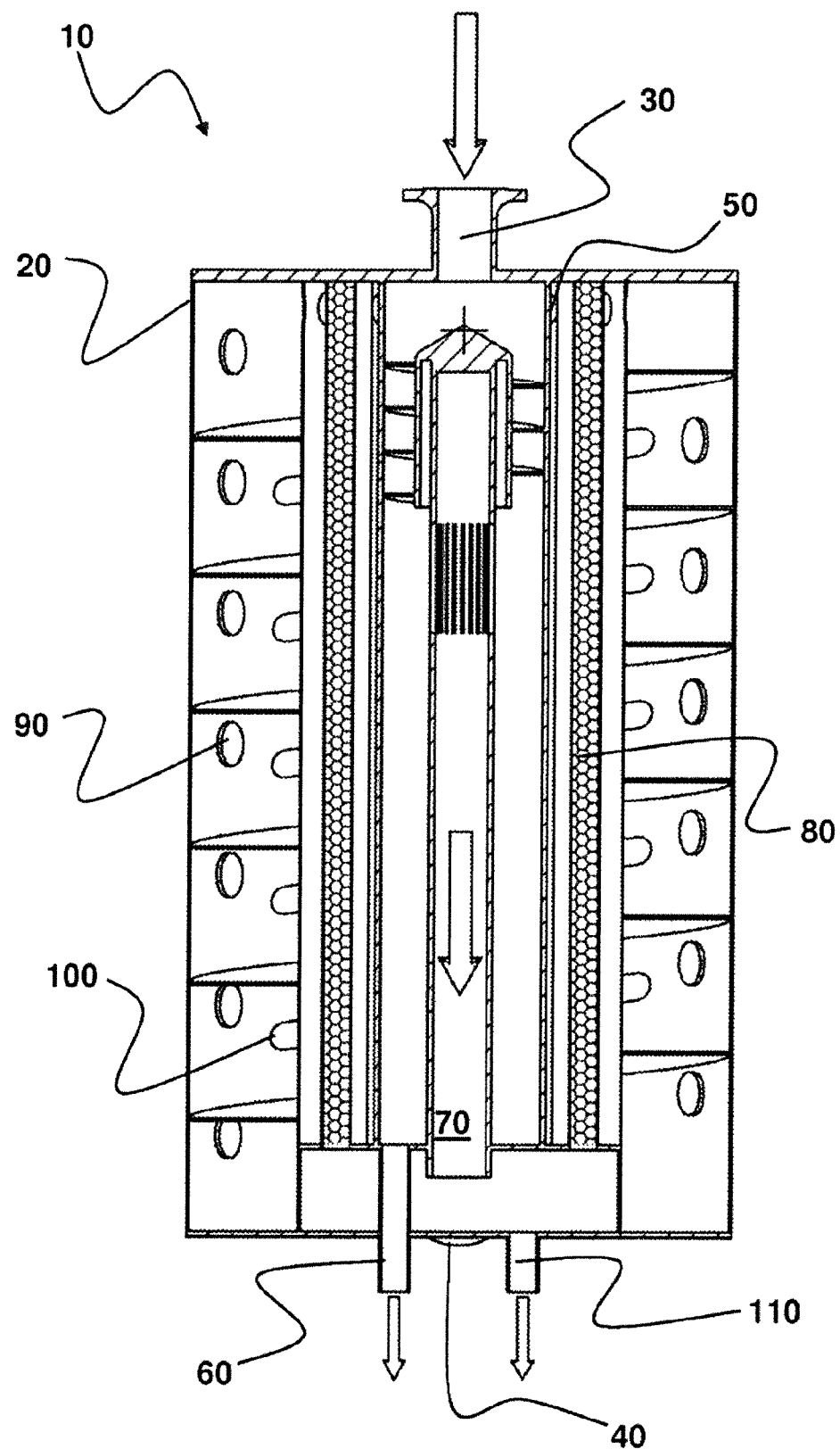

METHOD FOR TREATING BALLAST WATER AND DEVICE FOR TREATING BALLAST WATER

CROSS-REFERENCE TO RELATED APPLICATIONS

This application represents a National Stage application of PCT/DE2013/100325 entitled "Method for Treating Ballast Water and Device for Treating Ballast Water" filed Sep. 12, 2013, pending.

BACKGROUND OF THE INVENTION

The invention relates to a method for treating ballast water and a device for treating ballast water.

As is well known, ballast water is used for trimming (container) ships in order to, in particular, be able to ensure seaworthiness even during empty runs. The use of ballast water to stabilize ships is problematic insofar as organisms that are present in the water are taken in and carried away in the ships and released at the destination (or on the way).

This problem is dealt with using different mechanical, physical and chemical ballast water treatment methods which are intended to kill the organisms that are present in the ballast water.

Even though chemical methods appear to be especially effective, they do, however, create other (ecological) problems when the ballast water tank is emptied.

On the other hand, implementing mechanical or physical methods is space- and labor-intensive.

SUMMARY OF THE INVENTION

The object of the present invention is, therefore, to provide a method of treating ballast water that is particularly efficient and can be installed as a device in ships in a space-saving manner.

The basic concept of the invention is to advantageously combine mechanical and physical methods with one another. According to the present invention, it is thus provided that, in a first step, the ballast water is fed into a hydrocyclone, by means of which hydrocyclone particles are removed from the ballast water, to begin with. The particles or particle-containing ballast water is then stored temporarily in tanks and correctly disposed of (ashore), or subjected to a special treatment directed at the particles.

In a second step, the particle-depleted ballast water is preferably filtered using a filter having a mesh size between 30 and 40 μm and, in a third step, a gas is made to flow through it, and it is, at the same time, acted upon by ultrasound and irradiated with UV radiation.

It has been shown that having a gas flow through the ballast water that is acted on by ultrasound and radiation results in especially well-treated ballast water. It is in particular advantageous if the gas flows through the filtered ballast water in the form of finely dispersed gas bubbles, particularly preferably flowing in the same direction as the water. It is, however, also conceivable that the gas is introduced transversely or against the fluid stream. It is furthermore advantageous if the gas is an inert gas or a gas mixture containing an inert gas.

DETAILED DESCRIPTION OF THE DRAWINGS

FIG. 1 is a cross-sectional view of a particularly preferred exemplary embodiment of the invention.

DETAILED DESCRIPTION OF THE INVENTION

The device 10 according to the present invention has a housing 20, which preferably has a rotationally symmetric design, and in which at least the components contained in the housing 20 are arranged concentrically to one another. In this case, the housing 20 preferably has a circular configuration.

A ballast water inlet 30 is axially located on the top of the housing 20 of the device 10, which is connected to a hydrocyclone 50 arranged in the center of the housing 20. According to the method presented above, the hydrocyclone 50 is the first purification step. The particles generated in the outer area of the hydrocyclone 50 are discharged from the device via the particle outlet 60 and can be professionally disposed of or treated. On the other hand, the ballast water depleted of particles by means of the hydrocyclone 50 is conveyed through the outlet 70 to the next treatment step.

The second treatment step is the filter 80 which surrounds the hydrocyclone 50. Here, the filter 80 represents a permeable barrier, which divides the device into an intermediate chamber arranged between the hydrocyclone 50 and the filter 80 and an outer chamber arranged between the filter 80 and the housing 20. The particle-depleted ballast water coming from the hydrocyclone 50 is thus forced to pass through the filter 80, the smallest particles being retained by the filter 80 which has a preferred mesh size of 30 to 40 μm. The filter slurry can be collected in a filter slurry pan arranged below the hydrocyclone and the filter and discharged from the device 10 via the filter slurry outlet 110 where it can be correctly treated or disposed of.

Finally, in a third treatment step, the ballast water passing through the filter 80 is simultaneously acted on by ultrasound and irradiated with UV radiation at the same time as a gas is passed through it in the outer chamber arranged between the filter 80 and the housing 20. For this purpose, there are corresponding means for generating ultrasound 90 and means for generating UV radiation 100 in the outer chamber.

The advantage of this compact arrangement is the small space required by the device and the concomitant increase in efficiency in the treatment of ballast water. Furthermore, the means for generating ultrasound, for generating UV radiation, and for introducing a gas are preferably arranged in the outer chamber of the device 10 such that said means also act on the filter 80. Accordingly, the filter 80 is also acted on with ultrasound and UV radiation, so that not only is the filtered ballast water that is present in the outer chamber treated, but also the filter 80 is treated. As a consequence, the particles cannot permanently deposit on the filter 80, and the filter 80 is continuously cleaned, whereby the filtered particles can simply be removed via the filter slurry outlet 110.

The invention claimed is:

1. A device for treating ballast water, comprising
   a housing having
      an axially arranged ballast water inlet on the top thereof and
      a ballast water outlet arranged on the bottom thereof,
   a hydrocylone connected to the ballast water inlet having
      a particle outlet arranged on the bottom of the housing, which outlet discharges particles from the device, and
      an outlet carrying particle-depleted ballast water,
   a filter surrounding the hydrocyclone, which filter divides the device into an intermediate chamber arranged between the hydrocyclone and the filter and an outer chamber arranged between the filter and the housing, wherein the intermediate chamber is communicatively connected to the outlet of the hydrocyclone carrying particle-depleted ballast water, and an ultrasound generator acting on the outer chamber and/or the filter, a UV light generator acting on the outer chamber and/or the filter, and a gas inlet for introducing gas into the outer chamber of the device.

2. The device according to claim 1, characterized in that the ballast water inlet, the hydrocyclone, the filter surrounding the hydrocyclone, the ultrasound generator acting on the outer chamber and/or the filter, and the UV light generator acting on the outer chamber and/or the filter are concentrically arranged.

3. The device according to claim 1, characterized by a filter slurry outlet communicatively connected to the intermediate chamber, which filter slurry outlet discharges filter slurry from the device.

4. The device according to claim 2, characterized by a filter slurry outlet communicatively connected to the intermediate chamber, which filter slurry outlet discharges filter slurry from the device.

* * * * *